US010253544B2

(12) United States Patent
Kikuta (10) Patent No.: US 10,253,544 B2
(45) Date of Patent: Apr. 9, 2019

(54) CONTROL DEVICE AND CONTROL METHOD OF OPENING AND CLOSING MEMBER FOR VEHICLE

(71) Applicant: AISIN SEIKI KABUSHISIKI KAISHA, Kariya-shi, Aichi-ken (JP)

(72) Inventor: Takashi Kikuta, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/529,155

(22) PCT Filed: Sep. 25, 2015

(86) PCT No.: PCT/JP2015/004879
§ 371 (c)(1),
(2) Date: May 24, 2017

(87) PCT Pub. No.: WO2016/084291
PCT Pub. Date: Jun. 2, 2016

(65) Prior Publication Data
US 2017/0342757 A1    Nov. 30, 2017

(30) Foreign Application Priority Data

Nov. 26, 2014  (JP) ................................. 2014-238899

(51) Int. Cl.
| H02P 7/285 | (2016.01) |
| E05F 15/40 | (2015.01) |
| E05F 15/659 | (2015.01) |
| E05F 15/695 | (2015.01) |
| H02P 7/03 | (2016.01) |
| B60J 1/10 | (2006.01) |
| B60J 7/057 | (2006.01) |

(52) U.S. Cl.
CPC .......... *E05F 15/40* (2015.01); *E05F 15/659* (2015.01); *E05F 15/695* (2015.01); *H02P 7/05* (2016.02);
(Continued)

(58) Field of Classification Search
CPC ............ H02H 7/08; H02H 1/04; H02H 7/093; H02H 7/0851; E05F 15/659; E05F 15/41; E05F 15/632; E05Y 2400/30
(Continued)

(56) References Cited

U.S. PATENT DOCUMENTS 5,568,025 A * 10/1996 Sumida ................ H02H 7/0844
318/280
6,906,487 B2 * 6/2005 de Frutos ............. H02H 7/0851
318/280
(Continued)

FOREIGN PATENT DOCUMENTS

| JP | H07-166766 A | 6/1995 |
| JP | 2003-125596 A | 4/2003 |

(Continued)

OTHER PUBLICATIONS

International Preliminary Report on Patentability issued in international application No. PCT/JP2015/004879 on May 3, 2017 (including English translation).

(Continued)

*Primary Examiner* — Rina I Duda
(74) *Attorney, Agent, or Firm* — Finnegan, Henderson, Farabow, Garrett & Dunner, LLP (57) ABSTRACT

According to an embodiment of the present invention, a control device of an opening and closing member for a vehicle including a control portion outputting a control signal that switches a connection of a switch portion to control a drive motor closing and opening the opening and closing member mounted on the vehicle and a detection portion outputting a signal indicating the rotary direction of the drive motor to the control portion, wherein the control portion determines whether or not the switch portion is stuck on a basis of the signal from the detection portion, and in a case where the control portion determines that the switch
(Continued)

portion is stuck, the control portion outputs the control signal for switching the connection of the switch portion so as to stop the drive motor and to maintain the drive motor in a stop state is provided.

8 Claims, 8 Drawing Sheets

(52) U.S. Cl.
CPC .................. *B60J 1/10* (2013.01); *B60J 7/057* (2013.01); *H02P 7/285* (2013.01)

(58) Field of Classification Search
USPC ........ 318/280, 282, 283, 466, 468, 599, 811
See application file for complete search history.

(56) References Cited

U.S. PATENT DOCUMENTS

| | | | | |
|---|---|---|---|---|
| 7,307,395 B2* | 12/2007 | Bouamra | ................ | G01L 1/242 318/443 |
| 7,309,971 B2* | 12/2007 | Honma | ................... | G01P 3/489 318/280 |
| 7,346,272 B2* | 3/2008 | Franzan | ............... | H02H 7/0851 318/803 |
| 7,530,199 B2* | 5/2009 | Yokomori | ............. | E05F 15/603 49/506 |
| 8,704,476 B2* | 4/2014 | Egger | .................. | H02H 7/0851 307/9.1 |
| 2005/0275363 A1* | 12/2005 | Honma | ................. | E05F 15/659 318/280 |

FOREIGN PATENT DOCUMENTS

| | | |
|---|---|---|
| JP | 2009-142122 | 6/2009 |
| JP | 2010-220294 A | 9/2010 |

OTHER PUBLICATIONS

Official Letter issued in Canadian application No. 2,968,800 dated Apr. 12, 2018.

Notification of Reasons for Refusal issued in Japanese application No. 2014-238899 dated Apr. 19, 2018.

* cited by examiner

CONTROL DEVICE AND CONTROL METHOD OF OPENING AND CLOSING MEMBER FOR VEHICLE

CROSS-REFERENCE TO RELATED APPLICATIONS

This application is a national phase application of International Application No. PCT/JP2015/004879, filed Sep. 25, 2015, and claims the priority of Japanese Application No. 2014-238899, filed Nov. 26, 2014, the content of both of which is incorporated herein by reference.

TECHNICAL FIELD

The present invention relates to a control device and a control method of an opening and closing member for a vehicle.

BACKGROUND ART

A technology that electrically operates opening and closing of an opening and closing member of a vehicle, for example, a roof, by driving of a motor is known (see Patent document 1). The control technology of Patent document 1 drives to open and close the roof by separately driving a front portion and a rear portion of the roof The control technology of Patent document 1 controls a rotary direction of a drive motor and an opening and closing direction of the roof by switching on and off of a relay connected to the drive motor for driving the roof.

DOCUMENT OF PRIOR ART

Patent Document

Patent document 1: JP2009-142122A

OVERVIEW OF INVENTION

Problem to be Solved by Invention

There is a case in which a foreign object is caught between the opening and closing member and a vehicle body during a closing operation of the opening and closing member for the vehicle. In this case, the technology of Patent document 1 switches the relay to reverse the rotary direction of the drive motor after detecting the catch of the foreign object, hereby drives to open the opening and closing member. As such, the opening and closing member for the vehicle is configured to reduce a load applied to the foreign object that is caught. However, in the technology of Patent document 1, in a case where the relay is stuck to a closing operation side, a problem of incapability to drive to open the opening and closing member even in case of occurrence of the catch may occur. Similarly, in a case where the relay is stuck to an opening operation side, a problem of incapability to drive to close the opening and closing member may occur. In addition, in a case where, for example, the opening and closing member is driven to close in a state where the relay is stuck to the closing operation side, and thereby the foreign object is caught, it is favorable that the load applied to the foreign object is maintained to be reduced.

Taking the aforementioned problem into consideration, the objective of the present invention is to provide a control device and a control method of an opening and closing member for a vehicle achieving a failsafe for a state where a switch portion switching a rotation of a drive motor of the opening and closing member for the vehicle is stuck.

Means for Solving Problem

According to a mode of the present invention, a control device of an opening and closing member for a vehicle including a control portion controlling a starting movement of a rotation of a drive motor and a rotary direction of the drive motor by outputting a control signal for switching a connection of a switch portion, the drive motor closing the opening and closing member mounted on the vehicle by rotating in a first direction, the driving motor opening the opening and closing member by rotating in a second direction that is opposite to the first direction, and a detection portion outputting a signal indicating the rotary direction of the drive motor to the control portion, wherein the control portion determines whether or not the switch portion is stuck on a basis of the signal from the detection portion, and in a case where the control portion determines that the switch portion is stuck, the control portion outputs the control signal for switching the connection of the switch portion so as to stop the drive motor and to maintain the drive motor in a stop state is provided.

Effect of the Invention

The control device and the control method of the opening and closing member for the vehicle according to embodiments of the present invention may achieve the failsafe for the state where the switch portion switching the rotation of the drive motor of the opening and closing member for the vehicle is stuck.

MODE FOR CARRYING OUT THE INVENTION

Hereinafter, exemplified embodiments for conducting the present invention will be described in detail with reference to the drawings. A dimension, material, shape, and relative position of a component described in the embodiments described below are freely selected, and may be changed appropriately in response to, for example, a configuration of a device to which the present invention is applied. In addition, the scope of the present invention is not limited to a mode that is specifically described in the embodiments that are explained below unless otherwise specifically described. The drawings described below are provided with the same reference numerals for the components including the same functions, and the description of the components may not be provided repeatedly.

[First Embodiment]

Figure 1A:
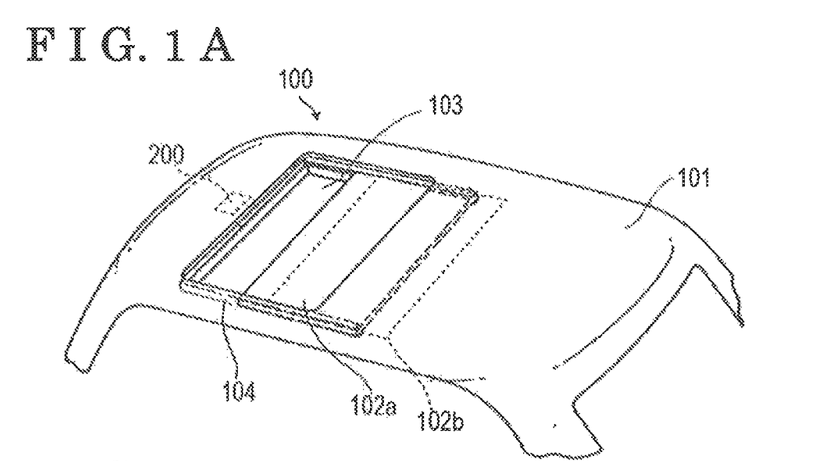
FIG. 1A is a schematic configuration view of a power sunroof unit.
Figure 1B:
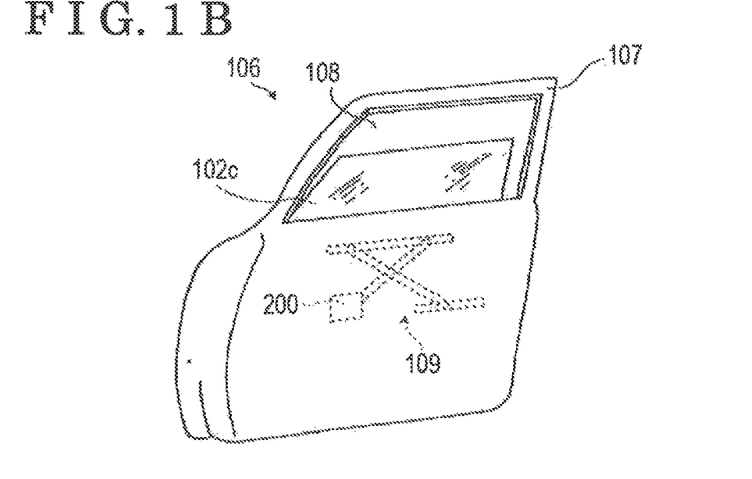
FIG. 1B is a schematic configuration view of a power window unit.

FIG. 1A is a schematic configuration view of a power sunroof unit 100. FIG. 1B is a schematic configuration view of a power window unit 106.

FIG. 1A illustrates the power sunroof unit 100 including a roof panel 102a, a shade panel 102b, and a control device 200 of an opening and closing member for a vehicle as an example of the opening and closing member for the vehicle. The roof panel 102a opens and closes an opening portion 103 formed at a vehicle roof 101. The shade panel 102b is disposed below the roof panel 102a and controls a quantity of light entered from the opening portion 103. The roof panel 102a and the shade panel 102b are movably supported by a guide plate 104 disposed along an inner rim of the opening portion 103. A user may open and close the roof panel 102a and the shade panel 102b that operate electrically by operating an opening and closing switch 110 being mounted at a predetermined position in the vehicle. That is, a signal commanding the roof panel 102a and the shade panel 102b to be driven to open or close outputs from the opening and closing switch 110 to the control device 200. The control device 200 rotates a drive motor 209 and moves the roof panel 102a and the shade panel 102b via a gear or a belt (not illustrated) in a front-rear direction of the vehicle in response to the signal. The user may separately operate the roof panel 102a and the shade panel 102b.

FIG. 1B illustrates a window glass 102c as an example of the opening and closing member for the device and a power window unit 106 including the control device 200 of the opening and closing member for the vehicle. The window glass 102c includes one end that is stuck to an elevating mechanism 109 and opens and closes an opening portion 108 formed at a door flame 107 in response to the movement of the elevating mechanism 109. The user opens and closes the window glass 102 that operates electrically by operating the opening and closing switch 110. That is, a signal commanding the window glass 102c to be driven to open or close is outputted to the control device 200 from the opening and closing switch 110. The control device 200 controls the drive motor 209 that moves the window glass 102c in an upper-lower direction of the vehicle via the elevating mechanism 109 in response to the signal.

Hereinafter, for an easy explanation, a roof panel 102a is supposed as an example of the opening and closing member for the vehicle, and relays 206 to 208 are supposed as an example of a switch portion. The opening and closing member for the vehicle may be the shade panel 102b and the window glass 102c, or may be other opening and closing members (for example, a hood, or a fuel filler lid) mounted on the vehicle.

[The Control Device of the Opening and Closing Member for the Vehicle]

Figure 2:
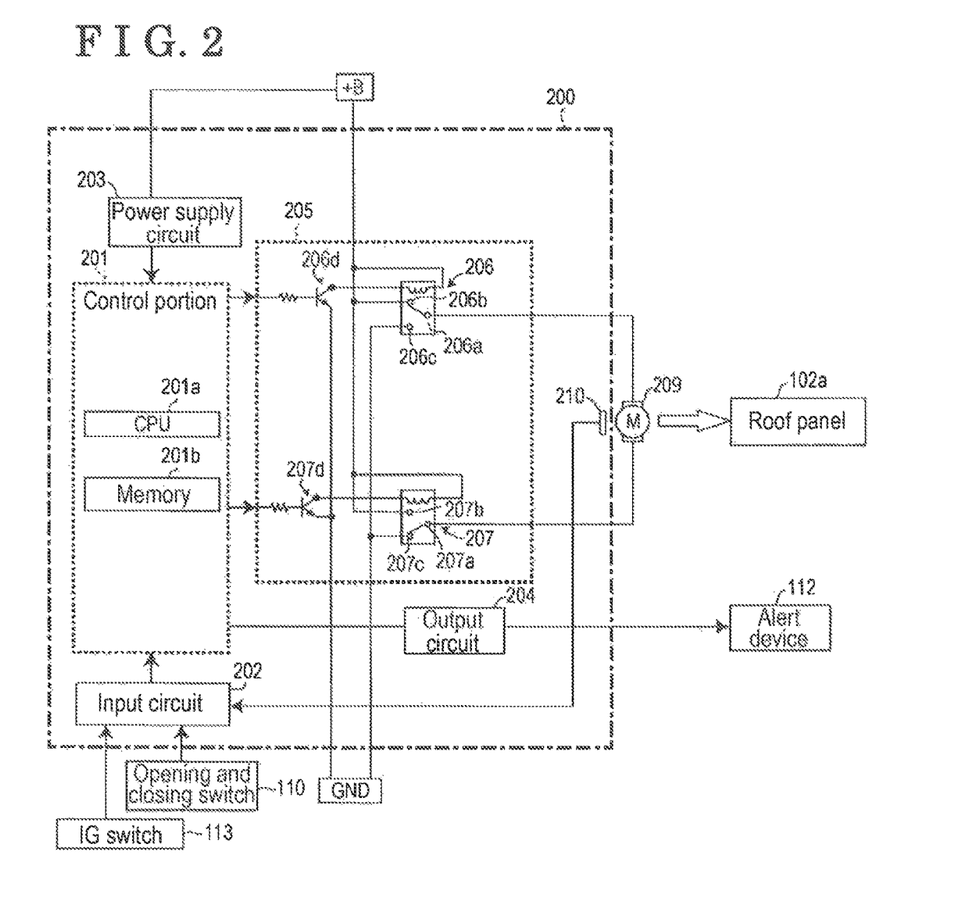
FIG. 2 is a functional block diagram of a control device according to a first embodiment.

FIG. 2 is a functional block diagram of the control device 200 of the opening and closing member for the vehicle. As shown in FIG. 2, the control device 200 includes a control portion 201, an input circuit 202, a power supply circuit 203, an output circuit 204, a drive circuit 205, and a pulse sensor 210. The control device 200 corresponds to a device controlling the drive motor 209 driving to open and close the roof panel 102a. The control device 200 may further include an oscillator providing a clock frequency and a hardware element of, for example, a counter circuit.

The control portion 201 includes, for example, a Central Processing Unit (CPU) 201a, a memory 201b, and a predetermined function that processes an inputted signal for controlling the operation of the opening and closing member for the vehicle by being cooperated with the CPU 201a and the memory 201b. The CPU 201a performs an arithmetic processing for achieving the predetermined function. The memory 201b includes, for example, a Read Only Memory (ROM) for memorizing a program and a Random Access Memory (RAM) for a temporary memory. The function of the control portion 201 may be memorized in the memory 201b as a software program executed by the CPU 201a or may be implemented in the control portion 201 as a hardware element.

The input circuit 202 includes, for example, an analog-to-digital converter (A/D converter) and an amplifier, and converts signals from the opening and closing switch 110, an ignition (IG) switch 113, and the pulse sensor 210 to digital signals that can be processed by the control portion 201. The power supply circuit 203 includes, for example, a direct current-to-direct current (DC-DC) converter that converts battery voltage ($V_B$) of a battery power supply +B of the vehicle to a voltage usable in the control portion 201. The output circuit 204 includes, for example, a digital-to-analog (D/A) converter or an amplifier, and converts control signals from the control portion 201 to signals usable in an alert device 112.

Here, the alert device 112 is mounted to a predetermined position in the vehicle, and alerts the user by the generation of light or sound, or by the display of the alert content in response to the control signal from the control portion 201. In addition, the IG switch 113 outputs signals indicating the start or the stop of an engine (or a power supply) of the vehicle to the control portion 201 that may recognize the start or the stop of the engine (or the power supply) of the vehicle based on the signals.

The drive circuit 205 includes the relays (switch portions) 206, 207 and transistors 206d, 207d. A terminal 206b of the relay 206 is connected to the battery power supply +B. A terminal 206c is connected to a ground GND. A terminal 206a is connected to the drive motor 209. A terminal 207a of the relay 207 is connected to the drive motor 209. A terminal 207b is connected to the battery power supply +B. A terminal 207c is connected to a ground GND. The drive circuit 205 may include other elements, for example, a resistance or a condenser, as required.

The transistors 206d, 207d function as a switch for switching the relays 206, 207 and as an amplified element by the control signals outputted from the control portion 201. The transistors 206d, 207d are configured by, for example, a bipolar transistor and a Field Effect Transistor (F.E.T). The control portion 201 switches ON and OFF of the transistors 206d, 207d by changing each of voltages of base terminals thereof. Accordingly, the control portion 201 may control a current flowing in solenoids of the relays 206, 207, and switch the connection of the relays 206, 207. When the transistors 206d, 207d are in an OFF state, the terminal 206a of the relay 206 and the terminal 207a of the relay 207 are connected to the ground GND. When the transistors 206d, 207d turn ON, the current running in the solenoids of the relays 206, 207 changes to connect the terminals 206a, 207a to the battery power supply +B. In other words, the control portion 201 connects the terminal 206a of the relay 206 to the battery power supply +B by turning ON the transistor 206d (the connection of the terminals 206b and 206a). The control portion 201 connects the terminal 206a of the relay 206 to the ground GND by turning OFF the transistor 206d (the connection of the terminals 206c and 206a). The control portion 201 connects the terminal 207a of the relay 207 to the battery power supply +B by turning ON the transistor 207d (the connection of the terminals 207b and 207a). The control portion 201 connects the terminal 207a of the relay 207 to the ground GND by turning OFF the transistor 207d (the connection of the terminals 207a and 207c). As described above, in the description, a switching element of each of the relays is connected to the battery power supply +B when being in an ON state, and is connected to the ground GND when being in an OFF state.

The control portion 201 connects the relay 206 to the battery power supply +B and connects the relay 207 to the ground GND to rotate the drive motor 209 normally to drive to close the roof panel 102a. Meanwhile, the control portion 201 connects the relay 206 to the ground GND and connects the relay 207 to the battery power supply +B to rotate the drive motor 209 reversely to drive to open the roof panel 102a. In addition, the control portion 201 connects the relays 206, 207 to the battery power supply +B, or to the ground GND to stop the rotation of the drive motor 209 to stop the roof panel 102a. As such, the control portion 201 may control the drive motor 209 to start and stop rotating and control a rotary direction (normal rotation and reverse rotation) thereof by controlling voltage supplied to the drive motor 209 from the battery power supply +B of the vehicle. The drive motor 209 may be configured to drive to open when rotating normally, and to drive to close when rotating reversely.

Table 1 illustrates relationships between ON and OFF of the transistors 206d, 207d; the normal rotation, reverse rotation and stop of the drive motor 209; and the drive direction of the roof panel 102a. As described above, the relationships are not limited to the composition of Table 1, and may be appropriately changed. In the description below, the transistors 206d, 207d, the drive motor 209, and the roof panel 102a operate based on Table 1.

TABLE 1

|  | ON of 207d | OFF of 207d |
|---|---|---|
| ON of 206d | Stop | Normal rotation (close) |
| OFF of 206d | Reverse rotation (open) | Stop |

The pulse sensor 210 includes, for example, a hall element as a detection portion for detecting the rotation of the drive motor 209, and outputs a pulse signal in response to the rotation of the drive motor 209 to the control portion 201. The control portion 201 may determine the rotary state (the normal rotation, the reverse rotation, or the stop) of the drive motor 209 based on a pulse number, a pulse duration, and a pulse frequency of the pulse signal from the pulse sensor 210. Furthermore, the control portion 201 may also determine the opening amount of the roof panel 102a by counting the pulse number of the pulse signal from the pulse sensor 210.

[Control method of the opening and closing member for the vehicle]

The control method of the control device of the opening and closing member for the vehicle according to the first embodiment will be described. After outputting control signals that stop opening and closing operations by detecting the catch of the foreign object, the control device according to the first embodiment monitors whether the relay is stuck, and in a case where the relay is stuck, the control device stops the movement of the opening and closing member for the vehicle and outputs the control signals to maintain the stop state thereof. A case where a foreign object is caught when the opening and closing member for the vehicle is driven to close is assumed in the description below, however, the present invention is similarly applicable in a case where the foreign object is caught when opening and closing member for the vehicle is driven to open by appropriately reading the description regarding the relationship of, for example, ON and OFF of the relay based on Table 1, conversely.

Figure 3:
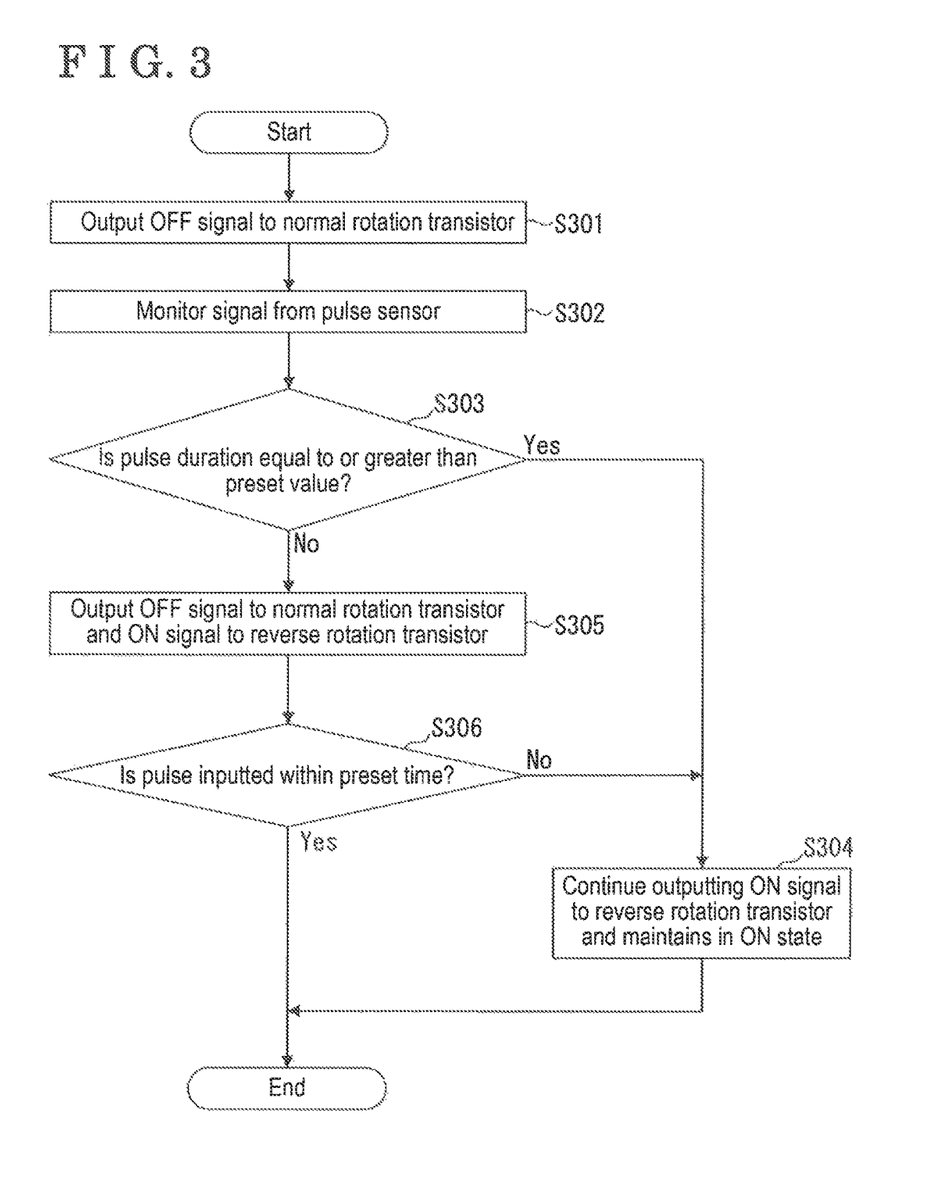
FIG. 3 is a control flowchart of an opening and closing member for a vehicle according to the first embodiment.

FIG. 3 is a control flowchart, controlled by the control device 200 of the opening and closing member for the vehicle, of the roof panel 102a as an example of the opening and closing member for the vehicle after the detection of the catch when the roof panel 102a is driven to open. In a state before Step S301, the opening and closing member for the vehicle is driven to close. When the control portion 201 detects that the foreign object is caught in the opening and closing member for the vehicle, the control flow in FIG. 3 executes.

Meanwhile, the catch may be detected on a basis of, for example, the change of the rotary speed of the drive motor 209 that can be calculated by, for example, the pulse signals outputted to the control portion 201 from the pulse sensor 210. For example, in a case where the variation of the rotary speed exceeds a predetermined value when the roof panel 102a is driven to open or close, the catch may be determined to occur. Alternatively, the catch may be determined on a basis of the magnitude of the load applied to the drive motor 209, and may be detected by, for example, a sensor.

In Step S301, the control portion 201 of the control device 200 outputs a voltage signal for stopping the closing operation of the drive motor 209 to a control terminal (a base terminal) of the transistor 206d. The signal corresponds to a signal for switching the operation of the drive motor 209 from the normal rotation to the stop by turning off the transistor 206d to switch the relay 206 from ON to OFF. Hereinafter, a signal sent from the control portion 201 to turn ON the relay is referred to as an ON signal, and similarly; a signal sent from the control portion 201 to turn OFF the relay is referred to as an OFF signal.

In Step S302, the control portion 201 starts monitoring the pulse signal inputted from the pulse sensor 210 to detect a stuck state of the relays 206, 207. In the first embodiment, as an example of a monitor of the pulse signal, the control portion 201 is used to acquire and control the duration time of the pulse signal after the OFF signal is outputted in Step S301. Meanwhile, the signal from the pulse sensor 210 may be monitored at the timing other than a timing in Step S302. For example, a signal indicating the start of the engine of the vehicle from the IG switch 113 may be a trigger, or a signal from the opening and closing switch 110 commanding the roof panel 102a to be driven to open may be a trigger. Having plural opportunities to monitor the signal from the pulse sensor 210 enhances the reliability of the detection of the stuck state.

In Step S303, the control portion 201 counts the duration time of the signal inputted from the pulse sensor 210 and determines whether the duration time is equal to or greater than a preset value that is previously determined. in a case where the duration time is equal to or greater than the preset value (In the case of Yes in S303), the drive circuit 205 is in a state of not being able to stop the closing operation of the roof panel 102a within the preset time even though the OFF signal of the relay 206 is outputted. In this case, the control portion 201 determines that the relay 206 is stuck in the ON state, and proceeds to Step S304. In a case where the duration time is less than the preset value (in the case of No in S303), the roof panel 102a is determined to stop the closing operation, however, whether the relay is stuck is not known. In this case, the control device proceeds to Step S305.

The reason why the duration time of the pulse is set as a monitor condition of the signal inputted from the aforementioned pulse sensor 210 is to reduce the possibility of determination error that the relay is not stuck in a case where the roof panel 102 stops the closing operation by the load generated by the catch of the foreign object. In a case where the relay 206 is not stuck, as a drive current does not flow to the drive motor 206 when the relay 206 turns OFF, the roof panel 102a stops closing in a short time. Thus, in a case where the stop of the roof panel 102a takes long time, the relay is assumed to be stuck. It is favorable that the preset value used for determination in Step S303 is set to be a value that is between the stop time required in a case where the relay is not stuck and the stop time required in a case where the relay is stuck. As the stop time in a case where the relay is stuck extends as the hardness of the foreign object caught decreases, it is favorable that the preset value is set such that the determination error most unlikely occurs on the presumption of the foreign object that may be caught.

In the case of Yes in Step S303, the control portion 201 of the control device 200 continues outputting the ON signal to a control terminal (a base terminal) of the transistor 207d to maintain the relay 207 in the ON state. Accordingly, the relays 206, 207 both turn ON, and the control flow is terminated in a state where the drive motor 209 is maintained in a stop state. As the relay 206 is stuck and cannot be turned off, the relay 207 is required to be maintained in the ON state after the flow ends. However, a function in which the control portion 201 may turn the relay 207 OFF may be added in a case where a user shows an intention of closing the roof panel 102a by the completion of the repair of, for example, the exchange of the relay 206 or by the confirmation of the release of the catch.

In the case of No in Step S303, the control portion 201 of the control device 200 outputs the OFF signal to the transistor 206d and the ON signal to the transistor 207d in Step S305. When the relay 206 is not stuck, the drive motor 209 comes to be in a reverse rotary state.

After that, the control portion 201 determines whether the pulse signal is inputted from the pulse sensor 21 within the preset time in Step S306. In a case where the pulse signal is inputted within the preset time (in the case of Yes in S306), the control portion 201 determines that the roof panel 102a is driven to open for releasing the catch and the relay is not stuck, thereby the control flow is terminated, in a case where the pulse signal is not inputted within the preset time (in the case of No in S306), the drive motor 209 does not perform the reverse operation. In this case, the control portion 201 determines that the relay 206 is stuck in the ON state, and proceeds to Step S304. The processing in Step S304 is the same as above described processing.

Figure 4A:
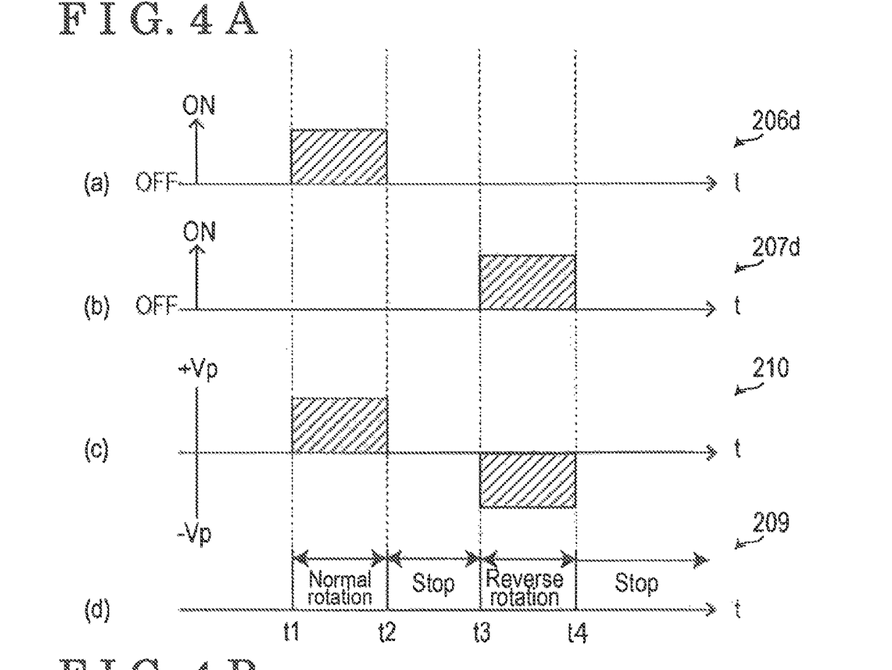
FIG. 4A is a timing chart illustrating a relationship of, for example, an ON/OFF of a transistor according to the first embodiment.
Figure 4B:
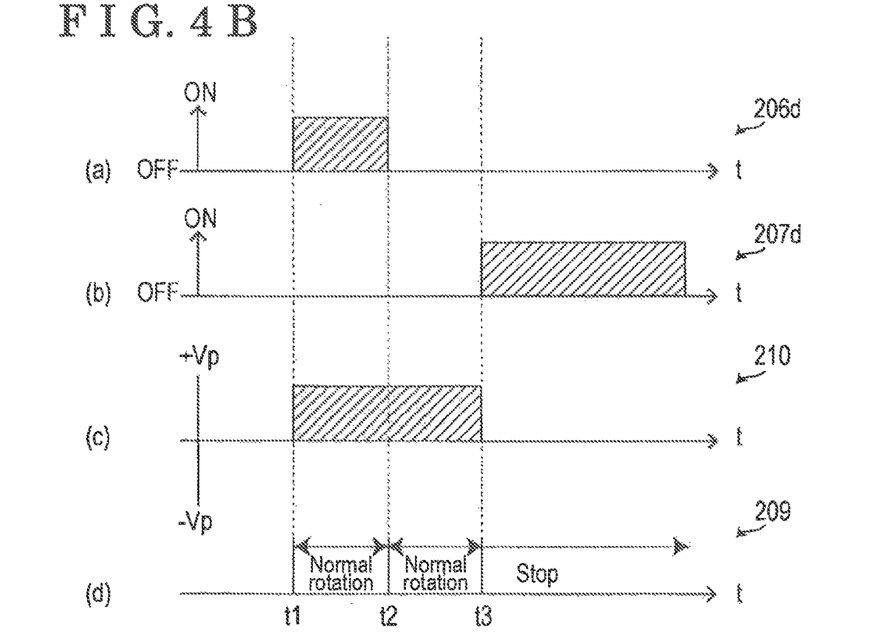
FIG. 4B is another timing chart illustrating the relationship of, for example, the ON/OFF of the transistor according to the first embodiment.
Figure 4C:
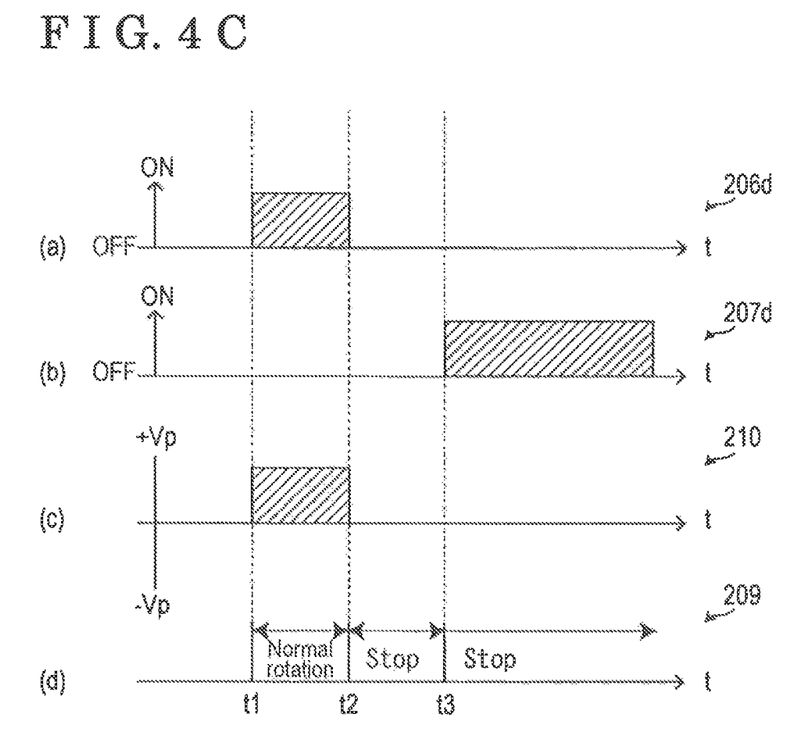
FIG. 4C is still another timing chart illustrating the relationship of, for example, the ON/OFF of the transistor according to the first embodiment.

FIGS. 4A, 4B and 4c are timing charts illustrating (a) ON and OFF of the transistor 206d, (b) ON and OFF of the transistor 207d, (c) a signal voltage (+Vp, −Vp) from the pulse sensor 210, and (d) the rotary direction of the drive motor 209. Each of the transistors turns ON in a case where the level of the operation timing shown in (a) and (b) is high, and turns OFF in a case where the level of the operation timing is low. In addition, (c) illustrates a state where the pulses showing that the drive motor 209 rotates normally when the signal is +Vp , and the drive motor 209 rotates reversely when the signal is −Vp are outputted. In a state of zero (0), the pulse is not outputted and the drive motor 209 stops. Hereinafter, the operation timings of the FIGS. 4A, 4B, and 4C will be described in the aforementioned order, however, regarding the steps performing the same process through each of the figures, the repeated description will be omitted.

FIG. 4A is a control timing chart in a normal state where the relay 206 is not stuck. In a flowchart in FIG. 3, in a case where the control portion 201 determines No in Step S303 and Yes in Step S306, the control portion 201 performs the control shown in the timing chart in FIG. 4A.

In a time t1, the control portion 201 sends the ON signal to the transistor 206d. Accordingly, the relay 206 turns ON, the relay 207 turns OFF, the drive motor 209 rotates normally and starts to close the roof panel 102a. At this time, the signal (+Vp) indicating the normal rotation of the drive motor 209 is inputted to the control portion 201 from the pulse sensor 210.

In a time t2, the foreign object is caught in the roof panel 102a and the control flow in FIG. 3 starts. In Step S301, the control portion 201 sends the OFF signal to the transistor 206d. Accordingly, the relay 206 turns OFF, the drive motor 209 stops and the roof panel 102a stops. At this time. the signal inputted from the pulse sensor 210 to the control portion 201 indicates that the drive motor 209 stops. In the same time, the control portion 201 starts monitoring the signal from the pulse sensor 210 in Step S302, and then determines whether the duration time of the signal from the pulse sensor 210 is equal to or greater than the preset value in Step S303. In the case of the timing chart in FIG. 4A, as the drive motor 209 stops immediately after the OFF signal is outputted, the control portion 201 determines that the duration time is equal to or lower than the preset value in Step S303 (determined No in Step S303) and proceeds to S305.

In a time t3, the control in Step S305 is operated. That is, the control portion 201 sends the ON signal to the transistor 207d, maintains the relay 206 OFF and turns the relay 207 ON, and the drive motor 209 rotates reversely. Accordingly, the roof panel 102a is driven to start opening, and the foreign object caught by the roof panel 102a is released. At this time, the signal (−Vp) indicating the reverse rotation of the drive motor 209 is inputted to the control portion 201 from the pulse sensor 210. In the case of the timing chart in FIG. 4A, as the drive motor 209 starts rotating reversely immediately after the ON signal is outputted, the control portion 201 determines that the pulse is inputted to the control portion 201 within the preset time (determined Yes in S306), and terminates the control flow in FIG. 3. After that, in a time t4, the control portion 201 sends the OFF signal to the transistor 207d, and the drive motor 209 stops the control of the reverse rotation when the foreign object is caught. In this case, as the relay 206 performs normally, the control portion 201 determines that the relay 206 is not stuck.

FIG. 4B is an example of a control timing chart in an abnormal state where the relay 206 is stuck. The timing chart shows an assumption of a ease where the foreign object caught by the roof panel 102a is a soft foreign object, and the roof panel 102a does not stop closing solely by the catch.

In a case where the control portion 201 determines Yes in Step S303 in the flowchart in FIG. 3, a control in a timing chart in FIG. 4B is performed.

In a time t2, even though the control portion 201 sends the OFF signal to the transistor 206d, the relay 206 does not turn OFF as being stuck in the ON state. Thus, the drive motor 209 continues rotating normally, and the signal inputted to the control portion 201 from the pulse sensor 210 remains to be the signal (+Vp) indicating the normal rotation. Accordingly, in Step S303, the control portion 201 determines that the duration time of the signal from the pulse sensor 210 is equal to or greater than the preset value (determined Yes in S303), and proceeds to Step S304.

In time t3, the control in Step S305 is operated. That is, the control portion 201 sends the ON signal to the transistor 207d, and turns the relay 207 ON. As the relay 206 maintains stuck to the ON state, the drive motor 209 stops. After that, as the drive motor 209 rotates normally again when the transistor 207d returns to be OFF, the control portion 201 continues sending the ON signal to the transistor 207d so that the relay 207 continues in the ON state. In this flow, the control portion 201 determines that the relay 206 is stuck.

FIG. 4C is another example of the control timing chart in the abnormal state where the relay 206 is stuck. The timing chart shows an assumption of a case where the foreign object caught by the roof panel 102a is a solid foreign object, and the roof panel 102a stops closing solely by the catch. In the flowchart in FIG. 3, in the case of No in Step S303 and No in Step S306, the control shown by the timing chart in FIG. 4C is performed.

In the time t2, even though the control portion 201 sends the OFF signal to the transistor 206d, the relay 206 does not turn OFF as the relay 206 is stuck in the ON state. However, in a case where the foreign object caught by the roof panel 102a is the solid foreign object, the roof panel 102a stops closing sorely by the catch and the drive motor 209 also stops. Thus, the signal inputted to the control portion 201 from the pulse sensor 210 indicates the stop. Accordingly, in Step S303, the control portion 201 determines that the duration time of the signal from the pulse sensor 210 is equal to or less than the preset value (determined No in S303), and proceeds to Step S305. Meanwhile, at this time, as the current is supplied to the drive motor 209 even though the roof panel 102a does not move due to the solidness of the caught foreign object, the load is continuously applied to the caught foreign object.

In the time t3, the control in Step S305 is operated. That is, the control portion 201 sends the ON signal to the transistor 207d. Even though the relay 207 turns ON, as the relay 206 is maintained stuck in the ON state, the drive motor 209 maintains in a stop state. Accordingly, the signal inputted to the control portion 201 from the pulse sensor 210 does not change. Thus, the control portion 201 determines that the pulse is not inputted to the control portion 201 within the preset time (determined No in S306), and proceeds to Step S304. The later processing is the same as the case in FIG. 4B. In the control, the state where the roof panel 102a stops is the same as the state of the catch state before the time t3, however, the load does not continuously apply to the caught foreign object from the drive motor. In the flow, the control portion 201 determines that the relay 206 is stuck.

As above, in the control flow in the first embodiment, whether the relay is stuck is determined by two steps which are Step S303 and Step S306. In Step S303, the control portion 201 determines whether the relay 206 is stuck in the on state when the catch occurs, and may stop closing the roof panel 102a even in a case where the relay 206 is stuck. Furthermore, as the control portion 201 determines whether the drive motor 209 rotates reversely in Steps S305, S306, the possibility of the determination error in which the relay is not stuck in a case where the roof panel 102a stops closing by the catch of the solid foreign object is reduced.

The determination method of the stuck state is not limited to the combination of Steps S303, S305, and S306 shown in FIG. 3. Any Steps S303 to S306 may be omitted, or other step may be added. Regarding the determination method of the stuck state, the operation control of the roof panel 102a by the detection of the catch has been described. However, the determination method of the stuck state is not limited to the operation of the roof panel 102a by the detection of the catch. For example, in a case where the user would like to control the operation of the roof panel 102a at a freely-selected position, Steps S305, S306 may be omitted. Specifically, in a case where the control portion 201 determines that the duration time of the signal from the pulse sensor 210 is less than the preset value in Step S303 (determined No in Step S303), the control portion 201 may determine that the roof panel 102a stops closing without considering the catch of the solid foreign object. On the other hand, in a case where the control portion 201 determines that the duration time of the signal from the pulse sensor 210 is equal to or greater than the preset value in Step S303 (determined Yes in Step S303), the roof panel 102a continuously performs the closing operation as the control portion 201 determines that the relay is stuck. In this case, the control portion 201 is required to stop the closing operation of the roof panel 102a (Step S304). Accordingly, there is no need to perform Steps S305, S306 for preventing the detection error that the relay is not stuck at the catch of the solid foreign object.

In the first embodiment, the control portion 201 may determine whether the relay is stuck. With this detection result, a step that may provide an alert to the user in a case where the relay is determined to be stuck may be added. In this additional step, the control portion 201 outputs a control signal to the alert device 112. The alert device 112 provides an alert to the user by the generation of light or sound, or the display of an alert content in response to the control signal. For example, the alert device 112 may alert the user that the roof panel 102a does not move, and that the exchange or repair of a component is encouraged. The alert may be performed by a voice that is provided in the vehicle, or by a display of a screen of a navigation device mounted in the vehicle. In a case where the relay is stuck, the control portion 201 may not open and close the roof panel 102a by not accepting the signal from the opening and closing switch 110 even the user operates the opening and closing switch 110.

The control portion 201 may use positional information for the control by acquiring the positional information of the roof panel 102a based on the output of the pulse sensor 210. The positional information may be data having two values indicating whether the roof panel 102a is in the open state or in the closed state. Alternatively, the positional information may be data of multiple values in which the opening width of the roof panel 102a is quantified.

The control portion 201 may determine whether or not executing the control flow on a basis of the positional information of the aforementioned roof panel 102a. For example, the control portion 201 may execute the control flow only in a case where the roof panel 102a is close to the fully-closed state. This is because the roof panel 102a may be stuck at the open state by the control portion 201 that executes the control flow in a case where the roof panel 102a widely opens, thereby the convenience of the user may be deteriorated. In a case where the control portion 201 detects the possibility of the catch when the roof panel 102a widely opens, the control portion 201 may retain the roof panel 102a in the stop state for a certain period of time, and then, close the roof panel 102a again by turning the relay 207 off. Accordingly, the control portion 201 may fully close the roof while inhibiting the catch.

[Second Embodiment]

A control device and a control method of an opening and closing member for a vehicle according to a second embodiment of the present invention will be explained.

[The Control Device of the Opening and Closing Member for the Vehicle]

Figure 5:
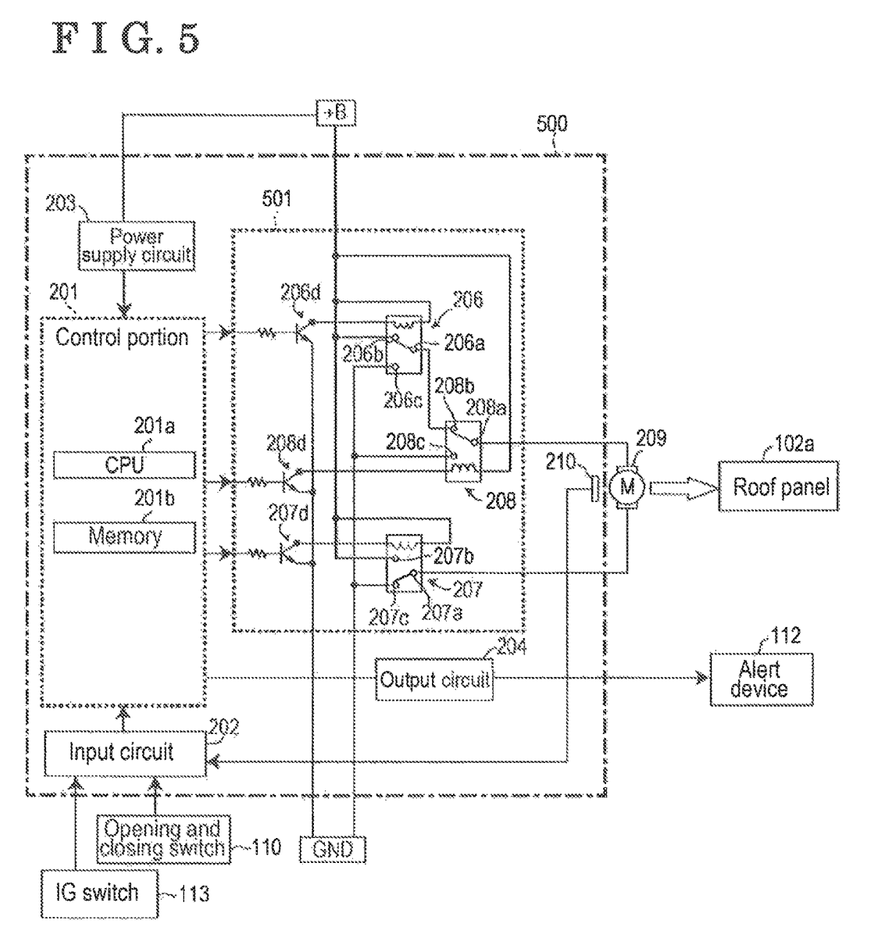
FIG. 5 is a functional block diagram of a control device according to a second embodiment.

FIG. 5 shows a functional block diagram of a control device 500 of the opening and closing member for the vehicle. As shown in FIG. 5, the control device 500 includes the control portion 201, the input circuit 202, the power supply circuit 203, the output circuit 204, a drive circuit 501, and the pulse sensor 210. The configurations of the control portion 201, the input circuit 202, the power supply circuit 203, and the output circuit 204 are substantially the same as those of the first embodiment, and the description will be omitted. The control device 500 may further include, for example, a power supply disconnection circuit, an oscillator providing a clock frequency, and a hardware element of, for example, a counter circuit.

The drive circuit 501 includes the relays 206 to 208 and the transistors 206d to 208d. That is, the drive circuit 501 of the second embodiment is different from the drive circuit 205 according to the first embodiment at a point of further including a relay 208 for emergency and a transistor 208d. The terminal 206b of the relay 206 is connected to the battery power supply +B, the terminal 206c is connected to the ground GND, and the terminal 206a is connected to a terminal 208b of the relay 208. The terminal 208b of the relay 208 is connected to the terminal 206a of the relay 206, the terminal 208c is connected to the ground GND, and the terminal 208a is connected to the drive motor 209. The terminal 207a of the relay 207 is connected to the drive motor 209, the terminal 207b is connected to the battery power supply +B, and the terminal 207c is connected to the GND. The drive circuit 501 may include other elements, for example, a resistance or a condenser as required.

The control portion 201 controls the current flowing in the solenoids of the relays 206 to 208 by turning the transistors 206d to 208d ON and OFF, respectively, and switches the connection of the relays 206 to 208. The terminal 208a of the relay 208 is in a connected state with the ground GND when the transistor 208d is in the ON state. When the transistor 208d turns OFF, the terminal 208a is connected to the relay 206. Then, the control portion 201 connects the terminal 208a of the relay 208 to the relay 206 by turning the transistor 208d OFF (the connection between the terminals 208b and 208a), and connects the relay 208 to the ground GND by turning the transistor 208d ON (the connection between the terminals 208c and 208a). The control of the relays 206, 207 is the same as that of the first embodiment, and the description thereof will be omitted.

That is, the control portion 201 connects the relay 206 to the battery power supply the relay 208 to the relay 206, and the relay 207 to the ground GND to rotate the drive motor 209 normally to close the roof panel 102a. Meanwhile, the control portion 201 connects the relay 207 to the battery power supply +B and the relay 208 to the ground GND to rotate the drive motor 209 reversely to open the roof panel 102a. In addition, the control portion 201 connects the relay 207 to the battery power supply +B, the relay 208 to the relay 206, and the relay 206 to the ground GND to rotate the drive motor 209 reversely to open the roof panel 102a. The control portion 201 connects the relays 206, 207 to the battery power supply +B or to the ground GND to stop the rotation of the drive motor 209 and to stop the roof panel 102a. The control portion 201 connects the relays 207, 208 to the ground GND to stop the rotation of the drive motor 209 and to stop the roof panel 102a. As such, the control portion 201 controls the start and stop of the rotation of the drive motor 209 and the rotary direction thereof (the normal direction and the reverse direction) by controlling the voltage supplied to the drive motor 209 from the battery power supply +B of the vehicle.

Table 2 illustrates the relationship between the ON and OFF of the transistor 206d to 208d, and the normal rotation, the reverse rotation, and the stop of the drive motor 209.

|  | OFF of 207d | | ON of 207d | |
| --- | --- | --- | --- | --- |
|  | ON of 208d | OFF of 208d | ON of 208d | OFF of 208d |
| ON of 206d | Stop | Normal (Close) | Reverse (Open) | Stop |
| OFF of 206d | Stop | Stop | Reverse (Open) | Reverse (Open) |

[Control Method of the Opening and Closing Member for the Vehicle]

The control method by the control device of the opening and closing member for the vehicle according to the second embodiment will be described.

Figure 6:
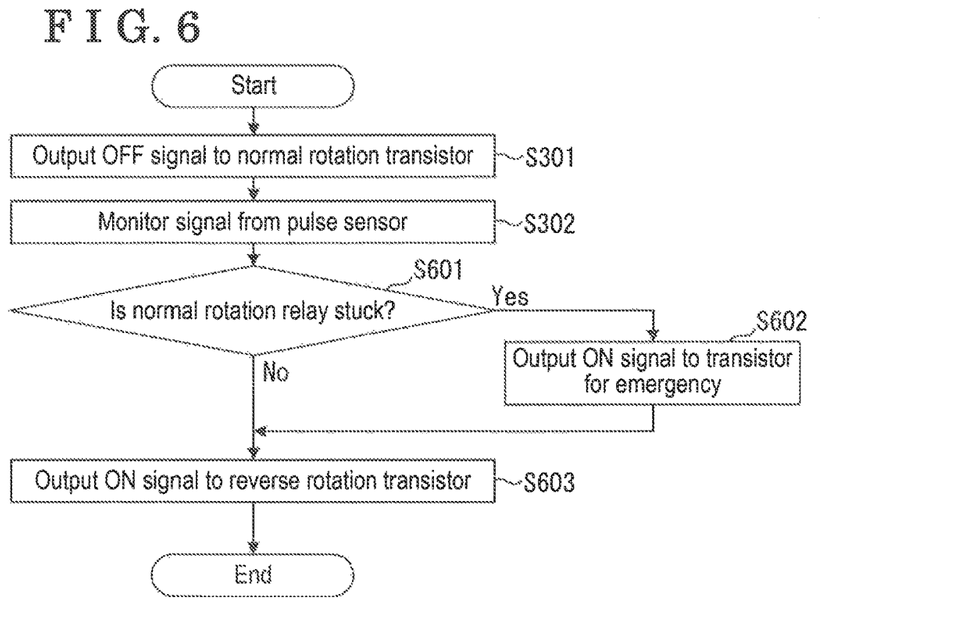
FIG. 6 is a control flowchart of an opening and closing member for a vehicle according to the second embodiment.

FIG. 6 is a control flowchart of the roof panel 102a as the opening and closing member for the vehicle by the control device 200 of the opening and closing member for the vehicle. Steps S301, S302 are the same as those of the first embodiment and the description will be omitted.

In Step S601, the control portion 201 determines whether the relay 206 is stuck. The determination of the stuck state may be performed by the same procedures as Steps S303, S305, S306 of the first embodiment, only by Step S303, or by other method. in a case where the relay 206 is stuck, the control portion 201 proceeds to Step S602, and in a case where the relay 206 is not stuck, the control portion 201 proceeds to Step S603.

In a case where the control portion 201 determines that the relay 206 is stuck in Step S601, the control portion 201 outputs the ON signal to the relay 208 for emergency in Step S602. Accordingly, the drive motor 209 stops as the relay 206 is stuck in an ON state, the relay 207 is in the OFF state, and the relay 208 turns ON. Then, the control portion 201 proceeds to Step S603.

In Step S603, the control portion 201 outputs the ON signal to the transistor 207d. Accordingly, the drive motor 209 rotates reversely and the catch of the foreign object of the roof panel 102a is released as the relay 206 is stuck in the ON state, the relay 207 is in the ON state, and the relay 208 turns ON.

Figure 7:
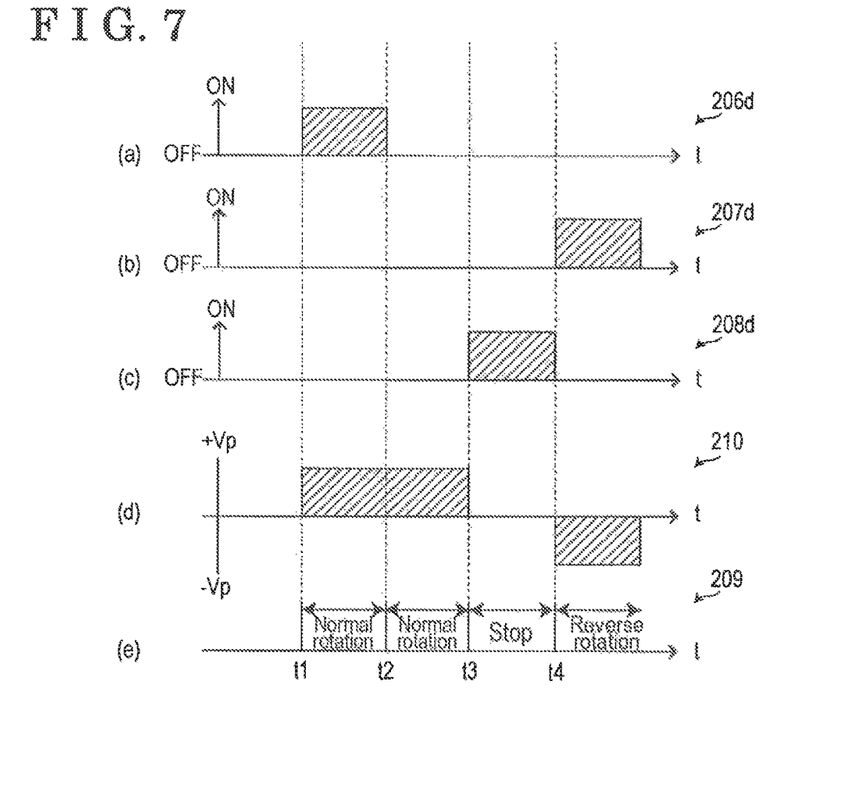
FIG. 7 is a timing chart illustrating a relationship of, for example, an ON/OFF of a transistor according to the second embodiment.

FIG. 7 is a timing chart illustrating (a) ON and OFF of the transistor 206d, (b) ON and OFF of the transistor 207d, (b) ON and OFF of the transistor 208d, (d) the signal voltage (+Vp, −Vp) from the pulse sensor 210, and (e) the rotary direction of the drive motor 209. In the flowchart in FIG. 6, in a case where the control portion 201 determines YES in Step S601, the control in the timing chart in FIG. 7 is operated.

In the time t1, the control portion 201 sends the ON signal to the transistor 206d, and sends the OFF signal to the transistor 208d. Accordingly, the relay 206 turns ON, the relay 208 turns OFF, the drive motor 209 rotates normally, and the roof panel 102a starts closing. At this time, the signal (+Vp) indicating the normal rotation of the drive motor 209 is inputted to the control portion 201 from the pulse sensor 210.

In the time t2, the roof panel 102a catches the foreign object, and the control flow in FIG. 6 starts executing. In a case where the OFF signal is outputted to the transistor 206d and the relay 206 is stuck, the drive motor 209 does not stop and continues rotating normally. Thus, in Step S601, the control portion 201 determines YES.

In the time t3, the control in Step S602 is operated. That is, the control portion 201 outputs the ON signal to the transistor 208d, and the drive motor 209 stops. Then, in the time t4, the control portion 201 sends the ON signal to the transistor 207d, and the drive motor 209 rotates reversely.

As such, in the second embodiment, even in a case where the relay 206 is stuck in the ON state, the reverse drive that is the same as that is operated at a normal time is available by using the relay 208 provided for emergency. Accordingly, in a case where the foreign object is caught in a state where the relay is stuck, the opening and closing member for the vehicle may not only stop hut also release the load applied to the foreign object by the reverse drive.

[A First Modified Example of the Second Embodiment]

Figure 8:
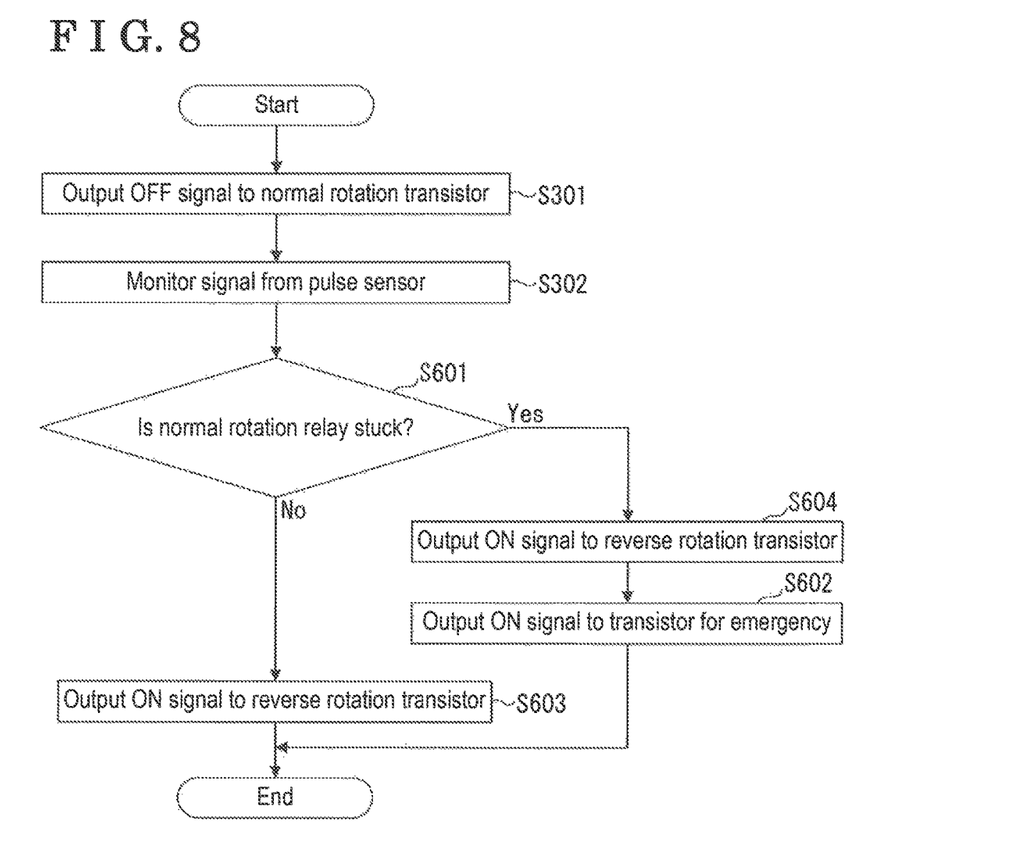
FIG. 8 is a control flowchart of an opening and closing member for a vehicle according to a modified example of the second embodiment.

FIG. 8 is a flowchart according to a modified example of the second embodiment. The difference from FIG. 6 is that Step S604 outputting the ON signal to the transistor 207d is provided before Step S602 outputting the ON signal to the relay 208. In Step S604, the drive motor 209 stops as the relay 206 is stuck in the ON state, the relay 207 turns ON, and the relay 208 is in the OFF state. Then, in Step S602, the control portion 201 outputs the ON signal to the relay 208. Accordingly, the drive motor 209 rotates reversely and the roof panel 102a releases the catch of the foreign object as the relay 206 is stuck in the ON state, the relay 207 is in the ON state, and the relay 208 turns ON. Thus, the same control as in the flowchart in FIG. 6 is realized in the first modified example.

[A Second Modified Example of the Second Embodiment]

As another modified example of the second embodiment, the relay 208 may be used as an alternative circuit of the relay 206 in a circuit in FIG. 5. The control portion 201 outputs a signal so as to have the relay 208 move reversely relative to the movement of the relay 206. The relationship between ON and OFF of the transistors 206d to 208d when in the normal operation, and the normal rotation, the reverse rotation, and the stop of the drive motor 209 will be illustrated in Table 3.

TABLE 3

|  | ON of 207d | OFF of 207d |
| --- | --- | --- |
| ON of 206d and OFF of 208d | Stop | Normal rotation (Close) |
| OFF of 206d and ON of 208d | Reverse rotation (Open) | Stop |

In a case where the relay 206 is stuck in the ON state, as the ON and OFF of the serial connection circuit of the relays 206 and 208 is determined by the ON and OFF of the relay 208, the movement when the relay 206 is stuck in the ON state will be as shown in Table 4.

TABLE 4

|  | ON of 207d | OFF of 207d |
| --- | --- | --- |
| OFF of 208d (Relay 206 is always ON) | Stop | Normal rotation (Close) |
| ON of 208d (Relay 206 is always ON) | Reverse rotation (Open) | Stop |

As can be seen from Tables 3 and 4, the same control as that of when in normal operation is available by using the relay 208 as the alternative circuit of the relay 206 even in a case where the relay 206 is stuck in the ON state. Accordingly, in the second modified example, similarly to the aforementioned embodiments, the stop and the reverse movement when the foreign object is caught when the relay 206 is stuck in the ON state is available, and the usability of the user may not be deteriorated even when the relay 206 is stuck.

[Other Embodiments]

In the first and second embodiments, a pulse width modulation (PWM) control may be operated as the control of the drive motor 209, and a switching element (a switch) other than the relay may be used as a switch portion. For example, the control device of the opening and closing member for the vehicle may be configured with a field effect transistor (FET as a substitute of the relays 206 to 208. At this time, the control portion 201 may be configured to output the control signal based on the PWM control with respect to FET provided as a switch portion. By having the above described configuration, even in a case where the FET is always in the ON or OFF state by the failure of the FET, the failsafe with respect to the failure may be realized by detecting the rotary direction of the drive motor. In a case where the FET is used instead of the relay as a switch portion, the construction will be described the same by reading the stuck state of the relay as the failure of the FET in the description of the aforementioned first and second embodiments.

This application claims priority to Japanese Patent Application 2014-238899, filed on Nov. 26, 2014, the content of which is incorporated herein by reference as a part of this application.

EXPLANATION OF REFERENCE NUMERALS

102: opening and closing member for vehicle
110: opening and closing switch
112: alert device
113: IG switch
200: control device of opening and closing member for vehicle
201: control portion
202: input circuit
203: power supply circuit
204: output circuit
205: drive circuit
206: relay (switch portion)
207: relay (switch portion)
208: relay (switch portion)
209: drive motor
210: detection portion of rotary direction of drive motor (pulse sensor)

The invention claimed is:

1. A control device of an opening and closing member for a vehicle, comprising:

a control portion controlling a starting movement of a rotation of a drive motor and a rotary direction of the drive motor by outputting a control signal for switching a connection of a switch portion, the drive motor closing the opening and closing member mounted on the vehicle by rotating in a first direction, the driving motor opening the opening and closing member by rotating in a second direction that is opposite to the first direction; and a detection portion outputting a signal indicating the rotary direction of the drive motor to the control portion; wherein the control portion determines whether or not the switch portion is stuck on a basis of the signal from the detection portion; and in a case where the control portion determines that the switch portion is stuck, the control portion outputs the control signal for switching the connection of the switch portion so as to stop the drive motor and to maintain the drive motor in a stop state;

the switch portion includes a first switch, a second switch, and a third switch that are controlled to turn on and off by the control signal from the control portion;

the first switch, the second switch, and the third switch are configured such that the drive motor rotates in the first direction in a first case where the first switch is in the on state, the second switch is in the off state, and the third switch is in the off state;

the drive motor rotates in the second direction in a second case where the first switch is in the off state and the second switch is in the on state;

the drive motor rotates in the second direction in a third case where the third switch is in the on state and the second switch is in the on state; and the drive motor stops in cases other than the first case, the second case, and the third case; and in a case where the control portion determines a stuck state in which the first switch is not switchable, the control portion stops the drive motor or maintains the drive motor in a stop state by switching the third switch.

2. The control device of the opening and closing member for the vehicle according to claim 1, wherein a determination whether or not the switch portion is stuck is executed in a case where a foreign object is caught by the opening and closing member when the opening and closing member is driven to open or close.

3. The control device of the opening and closing member for the vehicle according to claim 1, wherein the control portion determines that the switch portion is stuck in a case where the control portion is continuously inputted with the signal indicating that the drive motor rotates in the first direction or in the second direction from the detection portion for equal to or longer than a first preset time after outputting the control signal stopping the drive motor.

4. The control device of the opening and closing member for the vehicle according to claim 1, wherein the control portion determines that the switch portion is stuck in a case where the control portion is not inputted with the signal indicating that the drive motor rotates in the first direction or in the second direction until a second preset time elapses after outputting the control signal stopping the drive motor and then outputting the control signal reversing the rotary direction of the drive motor.

5. The control device of the opening and closing member for the vehicle according to claim 1, wherein the control portion controls the drive motor to reversely rotate by further switching the second switch.

6. The control device of the opening and closing member for the vehicle according to claim 1, wherein the control portion determines a position of the opening and closing member based on the signal from the detection portion; and the control portion determines whether or not to output the control signal for switching the connection of the switch portion so as to stop the drive motor and to maintain the drive motor in the stop state on a basis of the position of the opening and closing member.

7. The control device of the opening and closing member for the vehicle according to claim 1, wherein the control portion outputs the control signal based on a pulse width modulation control.

8. A control method of an opening and closing member for a vehicle, comprising steps of:

first outputting a control signal for switching a connection of a switch portion so as to stop a rotation of a drive motor of the opening and closing member mounted on the vehicle;

inputting a signal that indicates that the drive motor rotates;

determining that the switch portion is stuck on a basis of the signal indicating that the drive motor rotates in a direction closing the opening and closing member; and second outputting the control signal switching the connection of the switch portion so as to stop the drive motor and to maintain the drive motor in a stop state in a case where the switch portion is stuck; wherein the switch portion includes a first switch, a second switch, and a third switch that are controlled to turn on and off by the control signal;

the first switch, the second switch, and the third switch are configured such that the drive motor rotates in the first direction in a first case where the first switch is in the on state, the second switch is in the off state, and the third switch is in the off state;

the drive motor rotates in the second direction in a second case where the first switch is in the off state and the second switch is in the on state;

the drive motor rotates in the second direction in a third case where the third switch is in the on state and the second switch is in the on state; and the drive motor stops in cases other than the first case, the second case, and the third case; and in a case where, in the step of determining, a stuck state in which the first switch is not switchable is determined, outputting the control signal so as to stop the drive motor or maintain the drive motor in a stop state by switching the third switch at the step of second outputting.

* * * * *